US008531075B1

(12) United States Patent
Moore

(10) Patent No.: US 8,531,075 B1
(45) Date of Patent: Sep. 10, 2013

(54) MAGNETIC ELECTRICAL CONTACT SYSTEM

(76) Inventor: Christopher Moore, Prospect, KY (US)

( * ) Notice: Subject to any disclaimer, the term of this patent is extended or adjusted under 35 U.S.C. 154(b) by 0 days.

(21) Appl. No.: 13/548,595

(22) Filed: Jul. 13, 2012

Related U.S. Application Data

(63) Continuation-in-part of application No. 13/165,448, filed on Jun. 21, 2011, now Pat. No. 8,410,653.

(60) Provisional application No. 61/508,351, filed on Jul. 15, 2011.

(51) Int. Cl.
*H02K 3/00* (2006.01)

(52) U.S. Cl.
USPC ............ 310/179; 313/153; 310/201; 310/214

(58) Field of Classification Search
USPC ................. 313/153; 702/150, 190; 335/219, 335/285, 302, 303, 207; 310/179
See application file for complete search history.

(56) References Cited

U.S. PATENT DOCUMENTS

2011/0215740 A1* 9/2011 Ellis .............................. 315/362

* cited by examiner

*Primary Examiner* — Joseph L Williams
(74) *Attorney, Agent, or Firm* — Middleton Reutlinger; Alexander P. Brackett

(57) ABSTRACT

A system for completing an electrical circuit includes first and second base contacts electrically isolated from each other, each having a magnetic portion secured thereto, each magnetic portion having an opposite polarity, and each of said base contacts electrically connected to an electrical lead for transmitting an electrical signal through said base contacts. The system also includes first and second mating contacts electrically isolated from each other, each having a magnetic portion of opposite polarity secured thereto.

7 Claims, 13 Drawing Sheets

MAGNETIC ELECTRICAL CONTACT SYSTEM

CROSS-REFERENCE TO RELATED APPLICATIONS

The present application is a continuation-in-part and claims the benefit of U.S. Utility application Ser. No. 13/165,448 filed Jun. 21, 2011, entitled "Magnetic Lighting Circuit and Mounting System" now U.S. Pat. No. 8,410,653 and further claims the benefit of U.S. Provisional Application Ser. No. 61/508,351, filed on Jul. 15, 2011, entitled "Magnetic Electrical Contact System".

BACKGROUND OF THE INVENTION

1. Field of the Invention

The present invention relates generally to a magnetic and electrical circuit and more specifically to a system for low-voltage lighting that utilizes a magnetic circuit for mounting as well as a partial conduction path for supplying electrical power to a lighting element.

2. Description of the Related Art

A number of prior art low-voltage lighting systems have been designed to provide illumination to areas that aren't readily accessible by large lighting fixtures or that require task-specific illumination. Many of these systems are low-voltage track lighting type systems, wherein a track lighting rail is mounted to a structure, for example a wall or ceiling, and supplied with a source of power from a transformer or the like mounted at an end thereof, or recessed within the structure itself. Typically a plurality of fixtures may be located along the rail at desired locations and secured to the rail such that they receive low-voltage electrical power from contacts or conductive surfaces integral to the rail.

Many of these prior art systems utilize a wide variety of fastening and adjusting systems to enable attachment of the fixtures at various locations to illuminate a desired area or areas. Additionally, many known low-voltage lighting systems employ LED (light-emitting diode) lights to provide illumination while consuming a minimum of electrical power. Due to the inherent nature of LED lighting, a plurality of LED's are typically required to be mounted in a single location to provide sufficient illumination for most subjects.

Additionally, many modern buildings are being designed to utilize low-voltage lighting exclusively. In these systems, low-voltage supply cables are routed throughout the structure to provide a source of low-voltage power for a plurality of lighting systems. The low-voltage lighting fixtures and systems utilized in these designs must be readily mounted and easily adjustable to provide illumination for a large range of lighting tasks.

BRIEF DESCRIPTION OF THE DRAWING FIGURES

DETAILED DESCRIPTION OF THE PREFERRED EMBODIMENT(S)

Figure 1:
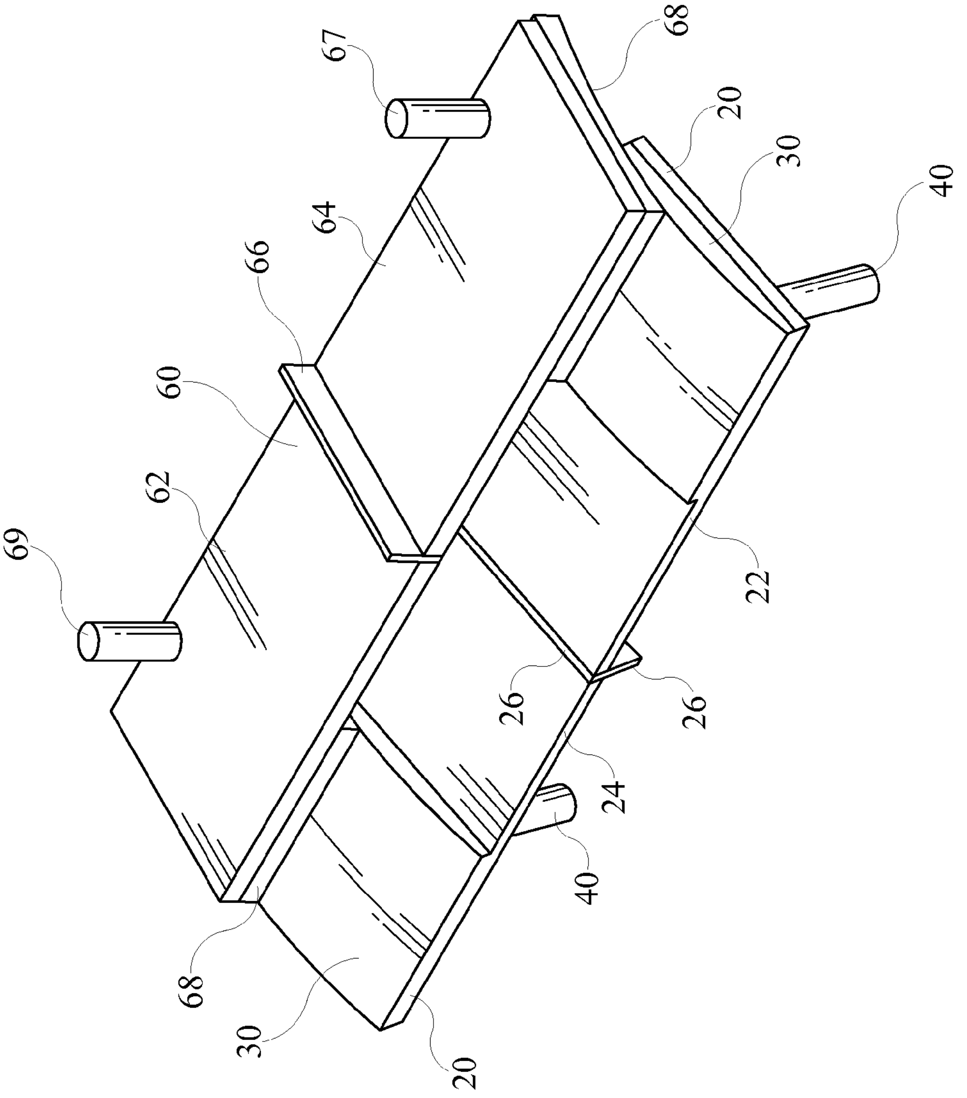
FIG. 1 is an isometric view of a hybrid magnetic lighting circuit in accordance with one embodiment of the present invention.
Figure 2B:
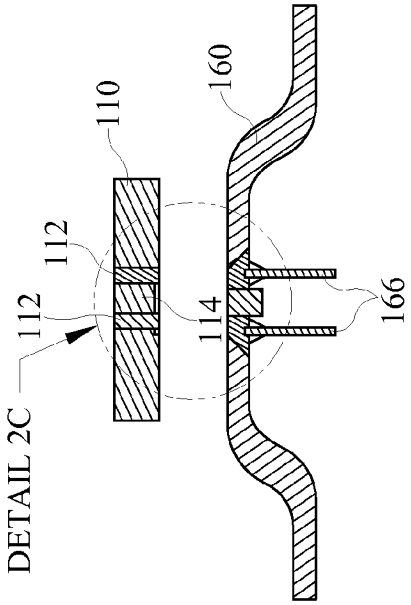
FIG. 2B is a cross-sectional view of a magnetic lighting mounting bracket taken along the line 2B-2B of FIG. 2A in accordance with one embodiment of the present invention.
Figure 2C:
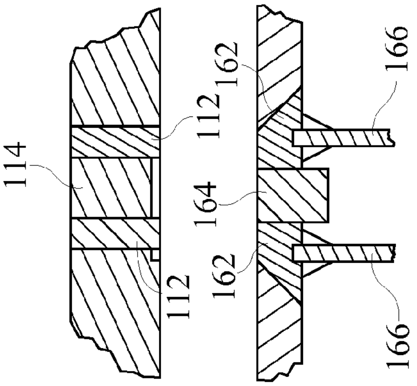
FIG. 2C is a detail view of a magnetic lighting mounting bracket shown in the circle 2C of FIG. 2B in accordance with one embodiment of the present invention.
Figure 2A:
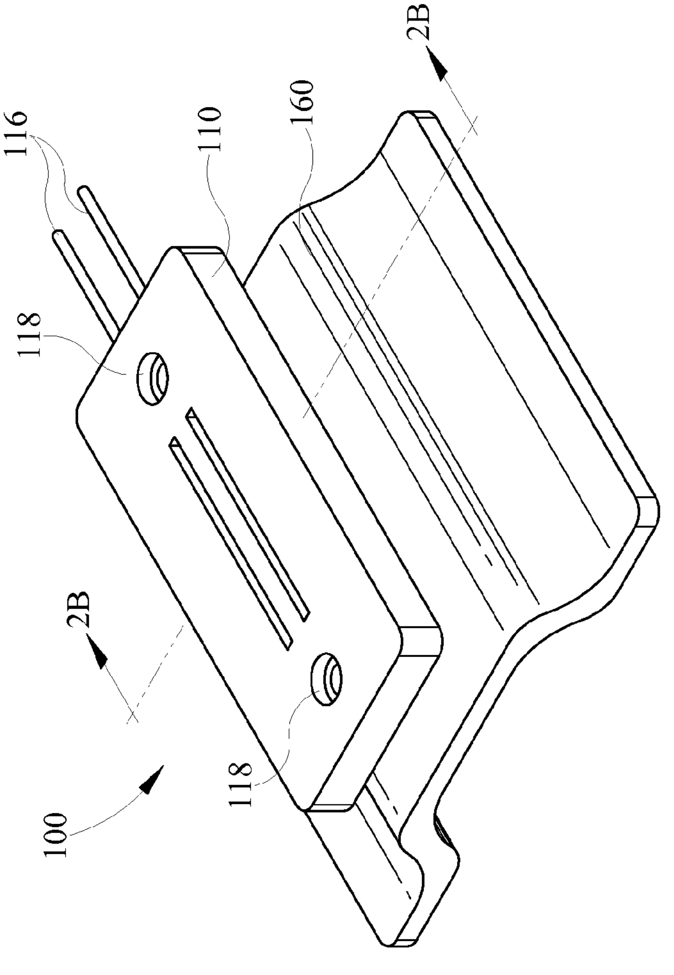
FIG. 2A is a perspective view of a magnetic lighting mounting bracket in accordance with one embodiment of the present invention.

With reference to FIG. 1, and in accordance with one embodiment of the present invention, a hybrid magnetic mounting system and lighting circuit 10 comprises a base element 20 having a pair of spaced permanent pole magnets 30 secured thereto. Base element 20 may be manufactured of, for example, a ferromagnetic material such as iron, and as shown in FIG. 1 is separated into two base halves, 22 and 24 having an insulator 26 there between to electrically isolate base half 22 from base half 24. Base element 20 may also be manufactured from any other material capable of transmitting magnetic flux without departing from the scope of the invention.

As also seen in FIG. 1, a pair of electrical leads 40 are operably connected to base element 20, for supplying a source of electrical power (not shown) to each base half 22, 24. Electrical current flows through each base element 20 half 22, 24 and into spaced permanent pole magnets 30. In one embodiment of the present invention, pole magnets 30 are comprised of a non-conductive magnetic material, for example ceramic magnets. In this embodiment of the invention, pole magnets 30 include an electrically conductive portion through non-conductive magnet 30 to permit current to flow from base element 20 through the conductive portion of non-conductive magnets 30, as will be discussed further below.

The invention shown in FIG. 1 further comprises an electrical element mount 60, also comprised of a ferromagnetic material in one embodiment, and also having two element mount halves 62, 64 separated by an insulator 66 to electrically isolate element mount half 62 from element mount half 64. Element mount 60 further comprises first and second of electrical connections 67, 69, for example electrically conductive leads, for supplying electrical power to an electrical element such as an LED (not shown).

Element mount 60 includes a shaped portion or portions 68 along a bottom surface that align with permanent magnets 30 of base element 20 such that permanent magnets 30 attract and magnetically engage element mount 60, thereby enabling it to be positioned in a plurality of orientations by simply moving element mount 60 with respect to base element 20. This feature of the present invention 10 enables an electrical element, for example a light or LED bank, to be positioned in a variety of orientations without the necessity of flexing or twisting wires and the like, while maintaining a secure electrical contact between a lighting element and a power source.

In operation, electrical current flows from one electrical lead 40, through a base element 20 into one permanent magnet 30, thence through element mount 60 and into an electrical connection 67 that is operably connected to an electrical element, for example, a lamp or plurality of LEDs. Current then flows through the electrical element, back into electrical connection 69, through element mount 60, through a second permanent magnet 30, through base element 20, and back to a power supply through lead 40. Since base element 30 and element mount 60 include electrically isolated halves 62, 64, low-voltage current is readily supplied through each half 62, 64 to power the electrical element while the magnetic circuit secures the base element 20 and element mount 60 together.

As best seen in FIGS. 2A-5 and in accordance with one embodiment of the invention, a powered mounting bracket 100 comprises an upper mounting bracket 110 comprised of a ferromagnetic material and a lower mounting bracket 160 that is secured to upper mount 110 by magnetic attraction. In one embodiment of the invention, upper mount 110 may be manufactured from a non-conductive material and comprise a pair of spaced magnetic and conductive elements 112, separated by a non-conductive portion 114. Conductive magnetic elements 112 are electrically coupled to incoming power leads 116, that are supplied with an external source of electrical power (not shown). As best seen in the detailed view of FIGS. 2B and 2C conductive elements 112 may extend to a lower surface of upper mounting bracket 110 in order to facilitate electrical contact with mounting bracket 160. Upper mounting bracket 110 may further comprise at least one aperture 118 for accepting a fastener to secure upper mounting bracket 110 to a mounting surface.

Lower mounting bracket 160 may be manufactured in a variety of shapes and be sized to accept a plurality of electrical elements, for example lamps or other lighting elements. The shape of lower mounting bracket 160 shown in the drawing Figures is exemplary only. Lower mounting bracket may be shaped in various forms to accommodate a wide variety of lighting elements without departing from the scope of the present invention. Lower mounting bracket 160 comprises a pair of spaced conductive magnetic elements 162 and a non-conductive magnetic element 164 disposed there between. The spaced magnetic elements 162 may further have an electrical lead or connection 166 secured thereto for attachment to an electrical element. Additionally, in one embodiment of the invention, conductive magnetic elements 112 of upper bracket 110 and conductive magnetic elements 162 of lower mounting bracket 160 are each opposed pairs of pole magnets. In this embodiment of the invention, upper bracket 110 and lower bracket 160 may only engage (magnetically attract) when pole magnets 112 and 162 are arranged so that north and south poles are aligned to attract one another. This feature of the invention enables mounting bracket 100 to be produced so that upper 110 and lower 160 brackets are only capable of being joined in one orientation, thereby preventing poor electrical contact to a lighting element.

In operation, magnetic elements 112 of upper mounting bracket 110 are placed adjacent magnetic elements 162 of lower mounting bracket 160 to complete a magnetic circuit between elements 162, 164 and 112, thereby securing lower mounting bracket 160 to upper mounting bracket 110 by magnetic attraction. As can be readily understood, this mounting system enables quick and simple arrangement and adjustment of a light or lamp (or other electrical element) by simply placing lower mounting bracket 160 proximate upper mounting bracket 110 until magnetic attraction secures brackets 160 and 100 together. Furthermore, the magnetic attraction between elements 112 and 162 place these elements in physical contact with each other thereby completing an electrical circuit from incoming power leads 116 through electrical leads 166 and supplying power to any devices operably connected to leads 166. Additionally, as soon as lower mounting bracket 160 is pulled away from upper mounting bracket 110 by supplying a force greater than their magnetic attraction, the power supplied to lower bracket 160 is thereby disconnected from any electrical element connected thereto.

Figure 3:
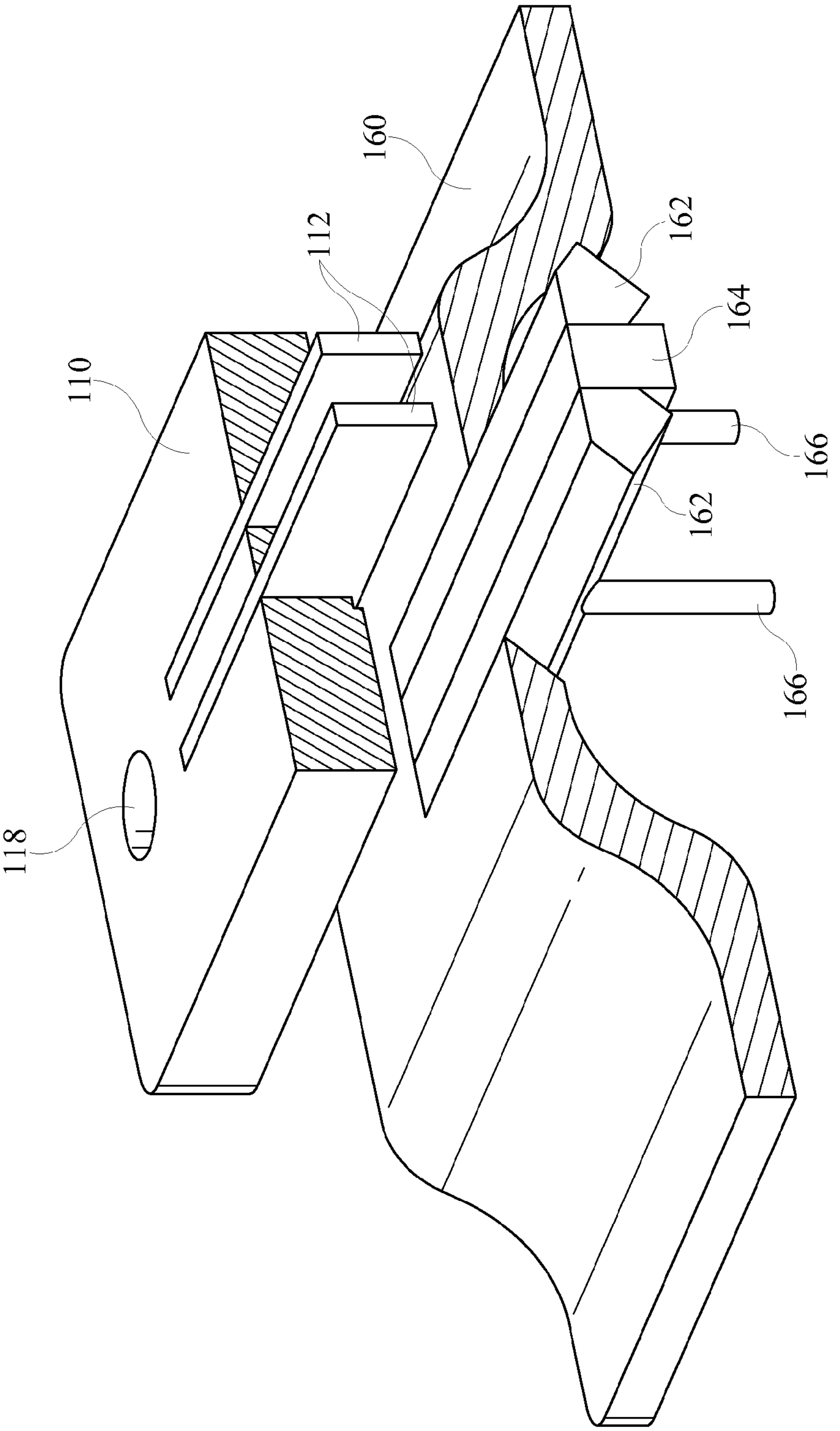
FIG. 3 is partial cross-sectional perspective view of a magnetic lighting mounting bracket in accordance with one embodiment of the present invention.
Figure 4:
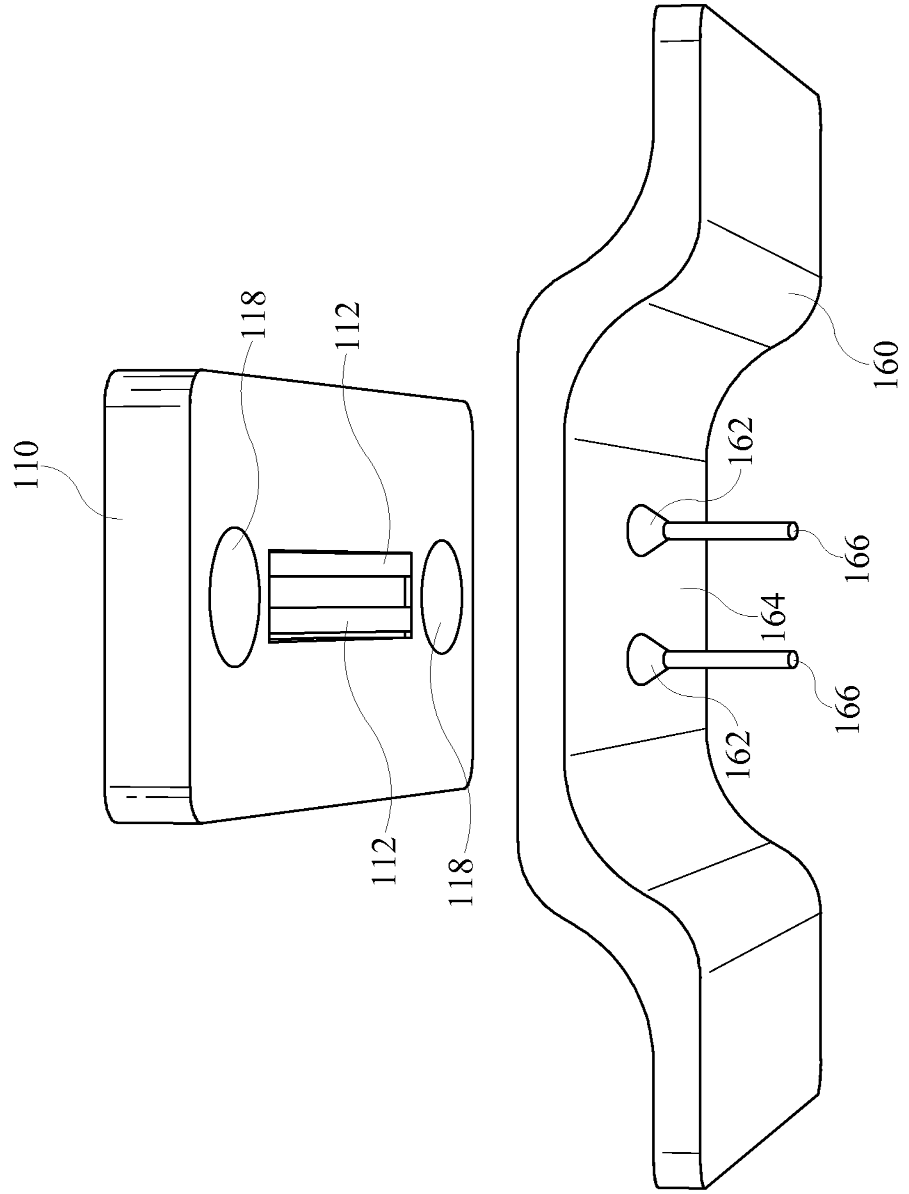
FIG. 4 is a perspective view of a magnetic lighting mounting bracket in accordance with one embodiment of the present invention.

In an alternative embodiment of the present invention magnetic elements 162 and 112 may be comprised of a non-conductive material having a conductive material path, for example a copper trace, disposed there through to complete the requisite electrical circuit of the present invention. FIG. 3 depicts a partial cross-section of this embodiment of the invention detailing the relative positions and spatial relationships of magnetic and conductive elements 112, magnetic and conductive (or non-conductive) elements 162, and non-conductive magnetic element 164.

Figure 6:
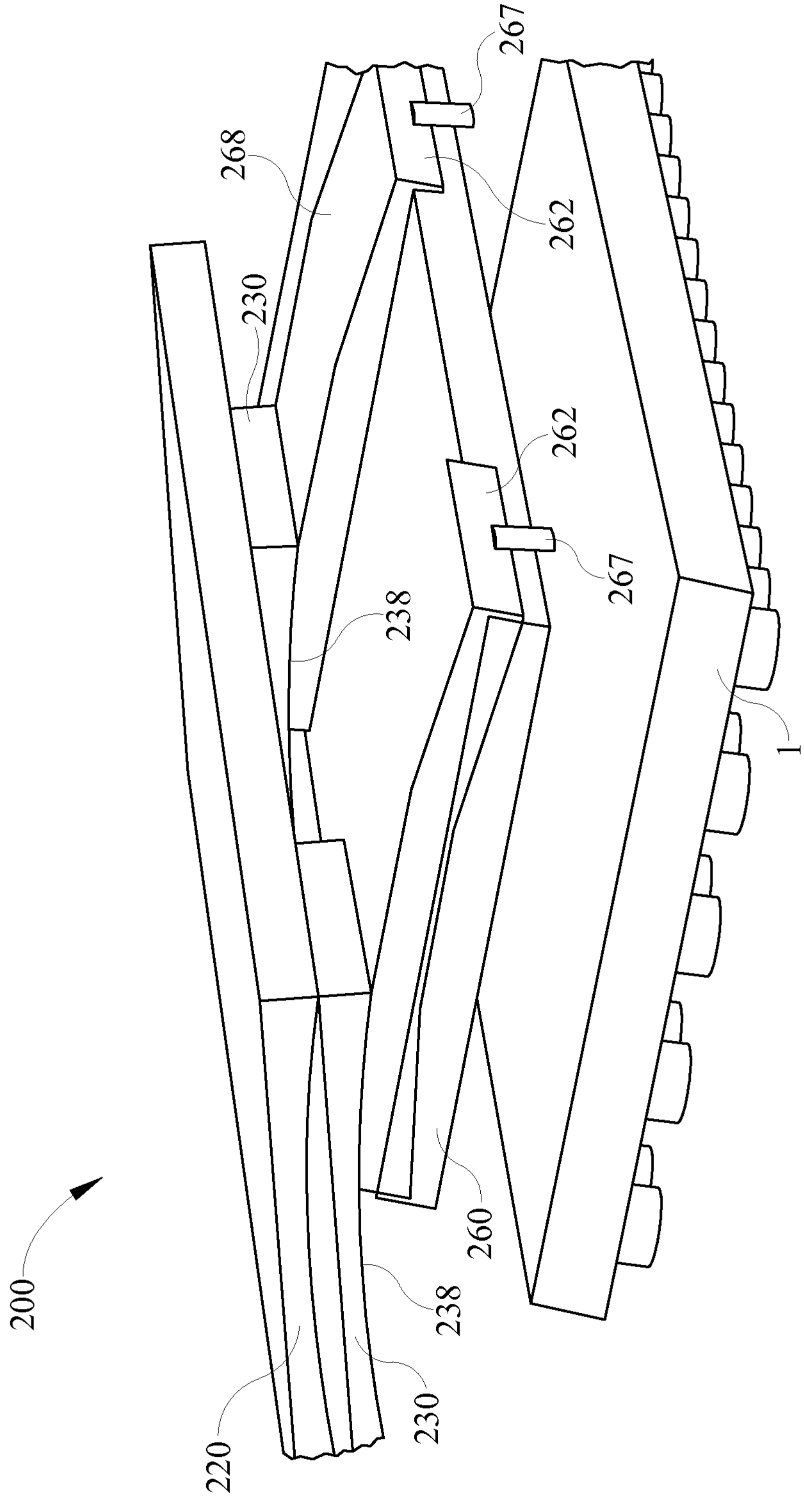
FIG. 6 is a perspective view of a magnetic mounting arrangement in accordance with one embodiment of the present invention.
Figure 7:
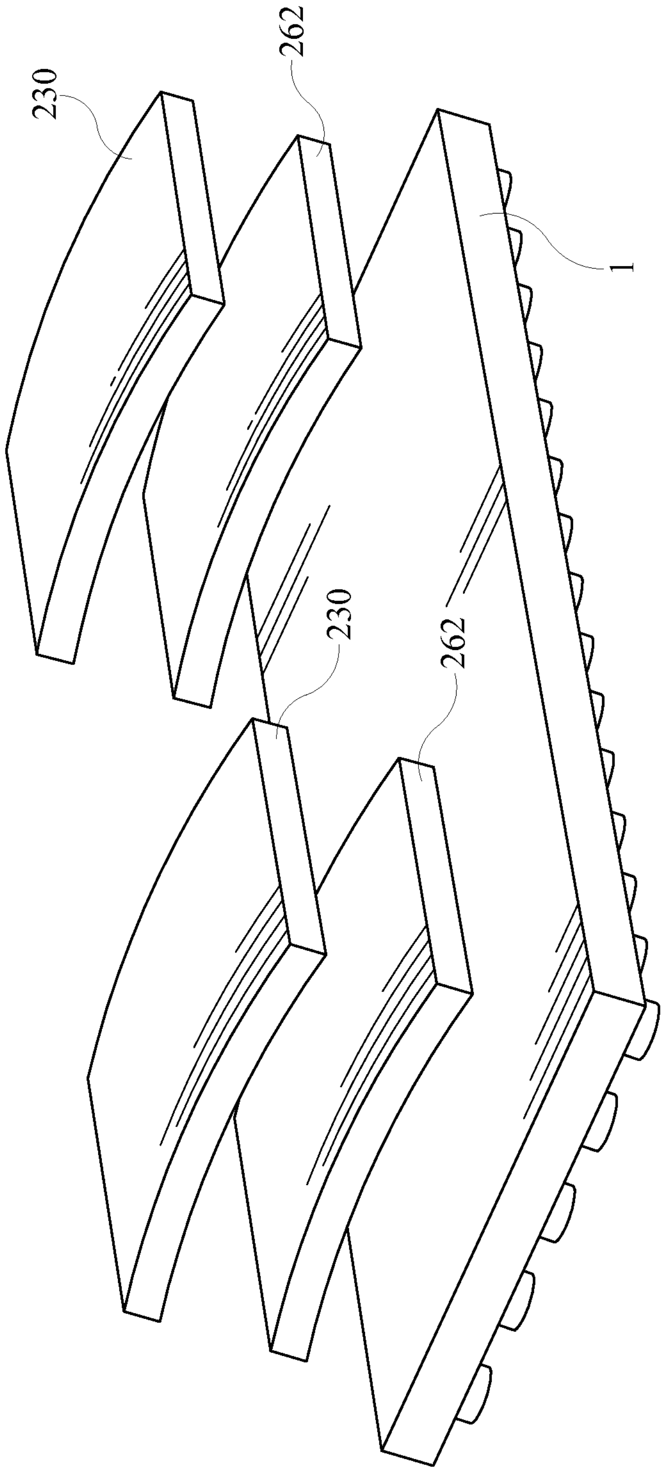
FIG. 7 is a perspective view of a magnetic mounting arrangement in accordance with one embodiment of the present invention.
Figure 8:
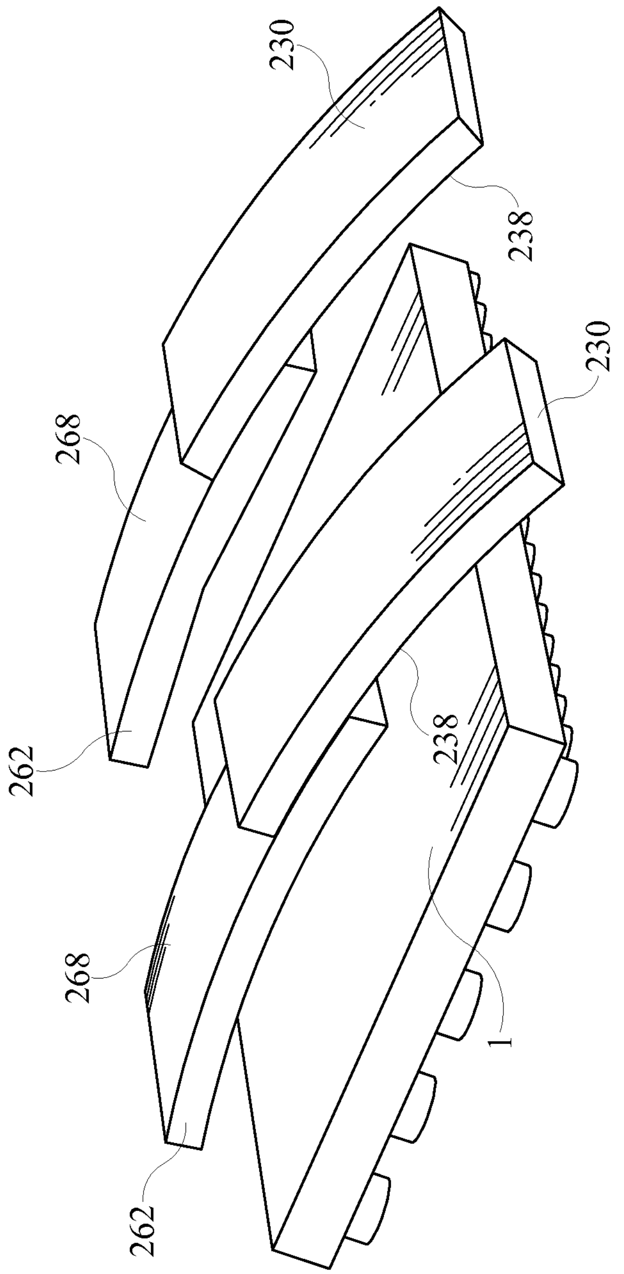
FIG. 8 is a perspective view of a magnetic mounting arrangement in accordance with one embodiment of the present invention.

Referring now to FIGS. 6-8, and in another constructed embodiment of the present invention a magnetic mounting system 200 to supply electrical power to an electrical element 1, depicted in FIG. 6 as an array of LED lights, comprises a magnetic circuit base element 220 having a pair of spaced permanent pole magnets 230 secured thereto. Base element 220 may be manufactured of, for example, an insulating (non-conductive) material such as ceramic or plastic. Base element 220 may also be manufactured from any other non-conductive material capable of transmitting magnetic flux without departing from the scope of the invention.

Similarly, an element mount 260, is also comprised of a non-conductive material in one embodiment of the invention. Element mount 260 may further comprise a pair of spaced magnetic elements 262 (for example north and south pole magnets) and a pair of electrical leads 267 in electrical contact with magnetic elements 262, and extending outwardly there from, for supplying electrical power to electrical element 1. Electrical element 1 is secured to element mount 260 and electrically connected to leads 267 through use of conventional fasteners or electrical connectors (not shown). Element mount 260 magnetic elements 262 include a shaped surface or surfaces 268 that align with complementary shaped surfaces 238 of permanent magnets 230 of base element 220 such that permanent magnets 230 attract and magnetically engage element mount 260, thereby enabling it to be positioned by simply moving element mount 260 with respect to base element 220. This feature of the present invention 200 enables electrical element 1 to be positioned in a variety of orientations without the need for additional wires or mechanical elements capable of rotation or flexion.

FIGS. 7 and 8 depict a plurality of alternative possible arrangements of and general shapes of magnetic elements 230 and 262, but are in no way to be considered to be limiting of the instant invention. It should be noted that electrical leads 267 for supplying power to an electrical element 1 are not shown in FIGS. 7 and 8.

Figure 9C:
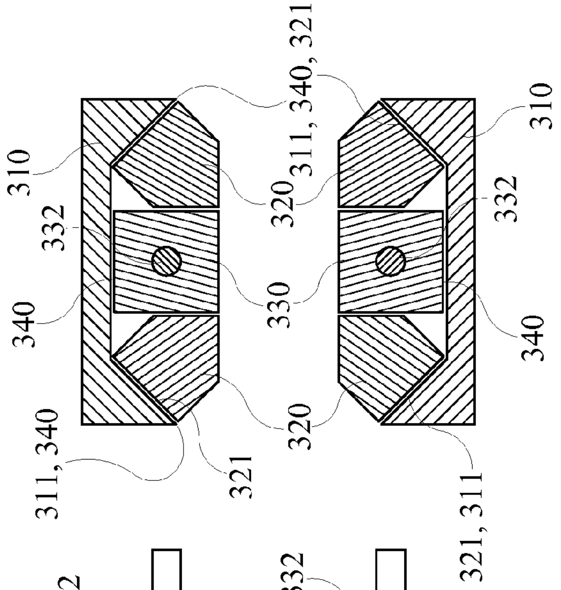
FIG. 9C is an end view of a hybrid magnetic and electrical conductive element taken along the line 9C-9C of FIG. 9B in accordance with one embodiment of the present invention.
Figure 9B:
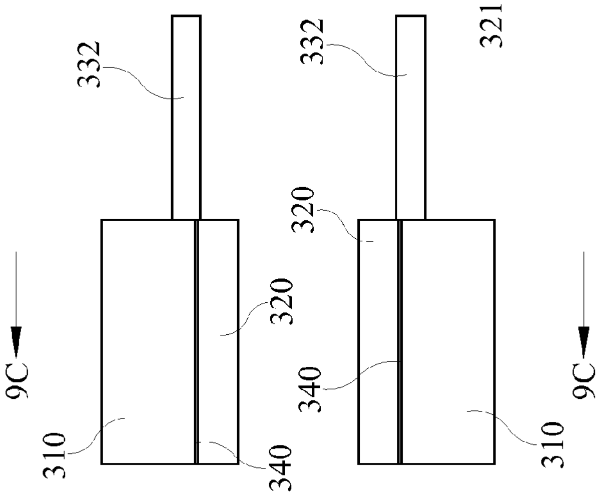
FIG. 9B is a side view of a hybrid magnetic and electrical conductive element taken along the line 9B-9B of FIG. 9A in accordance with one embodiment of the present invention.
Figure 9A:
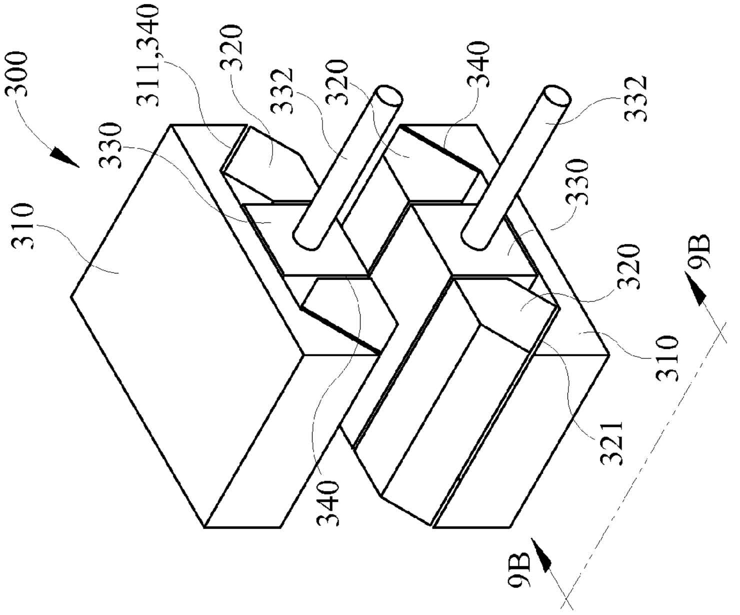
FIG. 9A is a perspective view of a hybrid magnetic and electrical conductive element in accordance with one embodiment of the present invention.

Referring now to FIGS. 9A-9C, and in accordance with another constructed embodiment of the present invention, a hybrid magnetic circuit 300 capable of supplying electrical power to an electrical element (not shown) comprises a ferromagnetic mounting element 310, shaped to receive a pair of spaced magnetic elements 320, each having a central conductive magnetic element 330 there between. Central element 330 is electrically connected to an electrical power lead 332 for delivering a source of electrical current to an electrical element. Furthermore, an insulating layer 340 is disposed between mounting element 310 and spaced magnetic elements 320 and central magnetic element 330 to inhibit the flow of electrical current between mounting element 310 and magnetic elements 320, 330. Mounting element 310 may be secured to a structure or other desired location using conventional fasteners as required.

Figure 5:
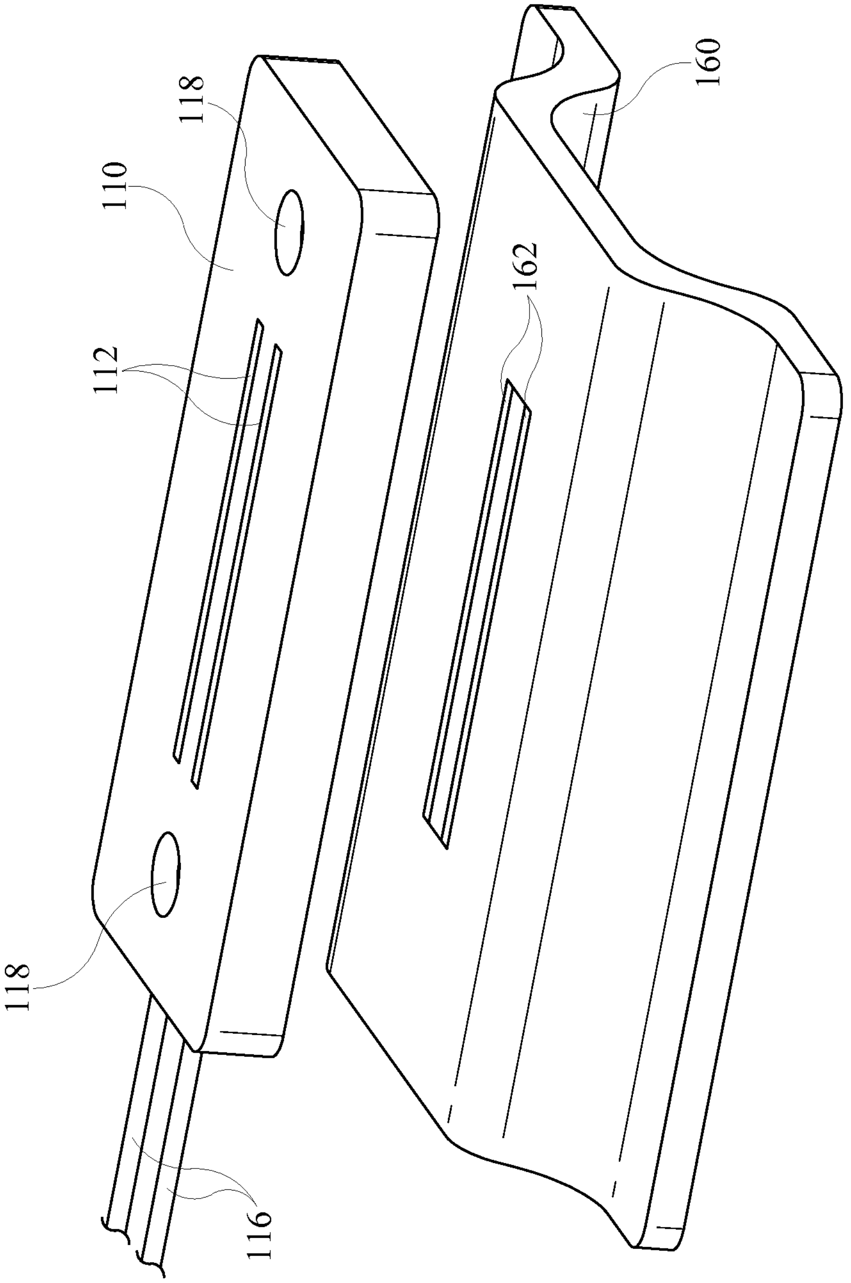
FIG. 5 is a perspective view of a magnetic lighting mounting bracket in accordance with one embodiment of the present invention.

Spaced magnetic elements 320 may be comprised of a non-conductive permanent magnetic material, for example a ceramic permanent magnet, in accordance with one embodiment of the present invention, such that spaced magnetic elements 320 are not capable of conducting current supplied through leads 332. Additionally, spaced elements 320 may have angled surfaces 321 thereon that abut a complementary angled surface 311 of mounting element 310 to enhance magnetic interaction (and thus magnetic attraction) between magnetic elements 320, 330 and mounting element 310. This feature of the present invention provides for a strong magnetic interaction between elements 320 and 330, thereby enabling mounting element 310 to be securely fastened to a ferromagnetic surface without the use of conventional fasteners. As can be seen in FIGS. 9A-C, mounting element 310 completes a magnetic circuit that can be used to secure hybrid magnetic circuit 300 to a ferromagnetic mounting plate 160 (as shown in FIG. 5, for example) or other ferromagnetic element as desired. Furthermore, opposed mounting elements 310, depicted in FIGS. 9A-C may be arranged in a side-by-side fashion, as depicted in FIGS. 10A-C.

Figure 10A:
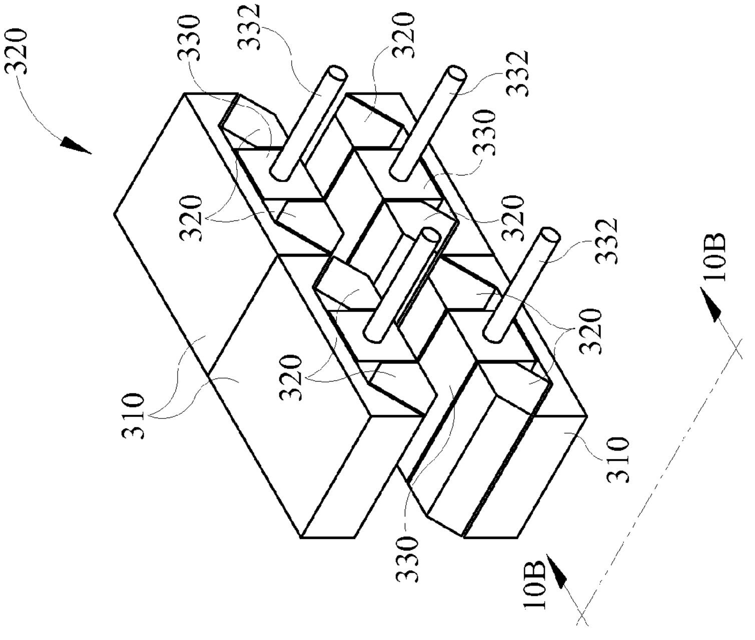
FIG. 10A is a perspective view of a hybrid magnetic and electrical conductive element in accordance with one embodiment of the present invention.
Figure 10B:
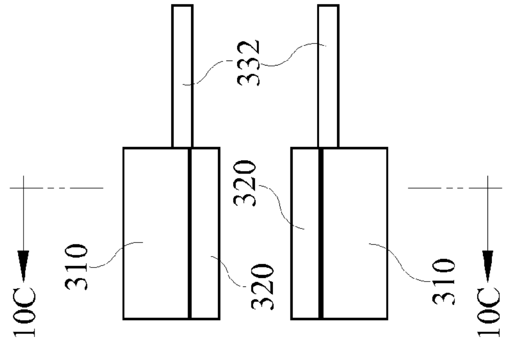
FIG. 10B is a side view of a hybrid magnetic and electrical conductive element taken along the line 10B-10B of FIG. 10A in accordance with one embodiment of the present invention.
Figure 10C:
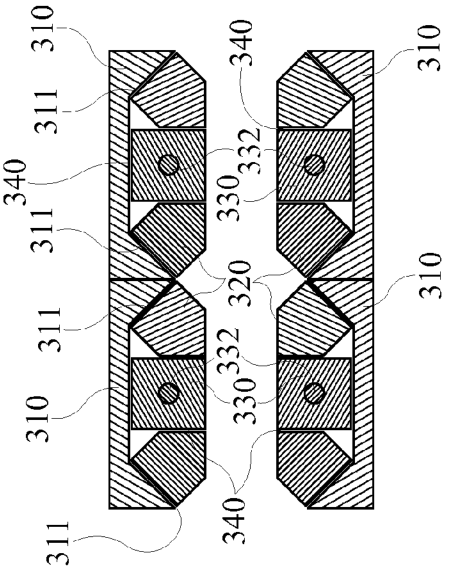
FIG. 10C is an end view of a hybrid magnetic and electrical conductive element taken along the line 10C-10C of FIG. 10B in accordance with one embodiment of the present invention.

FIGS. 10A-C depict an additional embodiment of the hybrid magnetic circuit 300 similar to that of FIGS. 9A-C whereby four mounting elements 310, each including a pair of permanent magnetic elements 320 and a central conductive magnetic element 330 are arranged together to provide a hybrid magnetic and electrical circuit in accordance with one embodiment of the invention. In this embodiment of the invention, electrical current flows between central elements 330, which act as conductors, to an electrical device (not shown) that is electrically connected to elements 330.

Figure 11C:
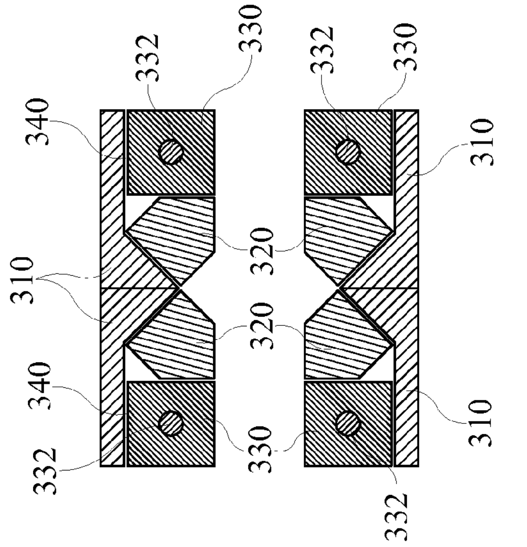
FIG. 11C is an end view of a hybrid magnetic and electrical conductive element taken along the line 11C-11C of FIG. 11B in accordance with one embodiment of the present invention.
Figure 11B:
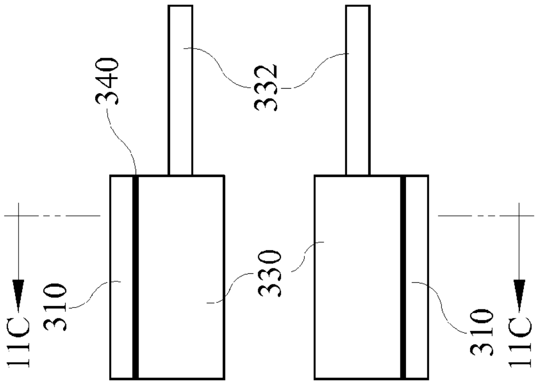
FIG. 11B is a side view of a hybrid magnetic and electrical conductive element taken along the line 11B-11B of FIG. 11A in accordance with one embodiment of the present invention.
Figure 11A:
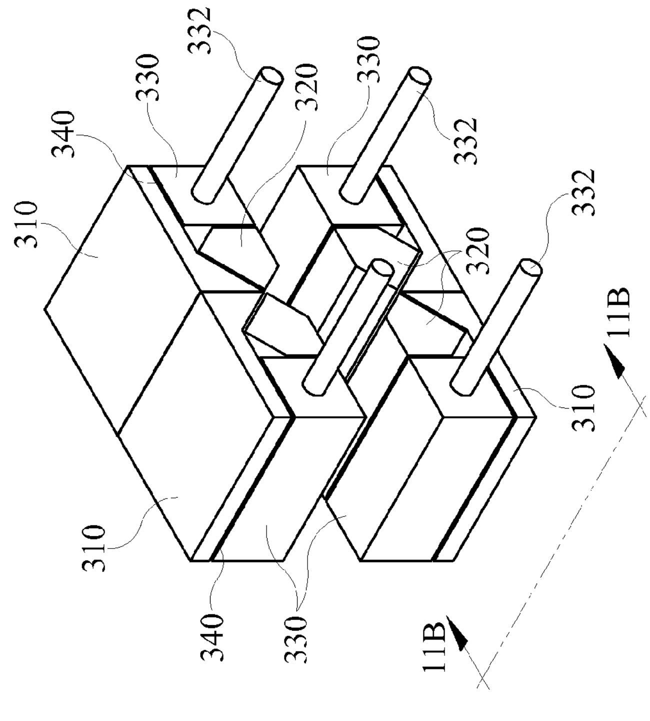
FIG. 11A is a perspective view of a hybrid magnetic and electrical conductive element in accordance with one embodiment of the present invention.

FIGS. 11A-C depict an alternate embodiment of the hybrid circuit 300 of FIG. 9 wherein a single non-conductive magnetic element 320 is positioned adjacent conductive magnetic element 330 and a mounting element 310 to provide a hybrid magnetic and electrical circuit in accordance with one embodiment of the invention.

Figure 12:
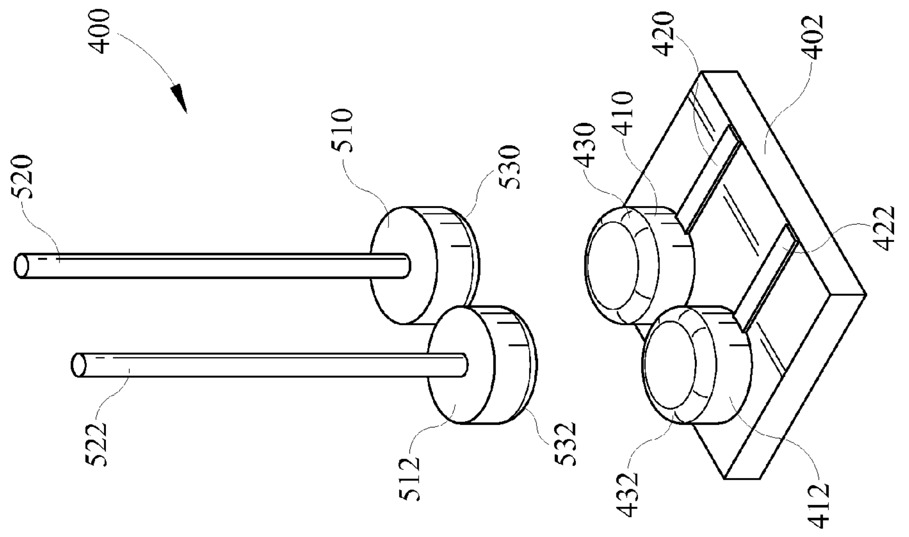
FIG. 12 is a perspective view of a magnetic electrical contact system in accordance with one embodiment of the invention.

Referring now to FIG. 12, a magnetic electrical contact system 400 comprises a circuit board 402, having a pair of base contacts 410, 412, each mounted or secured thereto. While reference will be made to a circuit board 402 on which base contacts are secured, it should be recognized that a wide variety of substrates or surfaces can be substituted for circuit board 402 without departing from the scope of the instant invention. For example, base contacts 410 may be secured to a wide variety of non-conductive materials suitable for inhibiting electrical signal propagation. Base contacts 410, 412 are spaced so that the electrical signals transmitted through contacts 410, 412 do not short together or otherwise contact each other.

Additionally, circuit board or substrate 402 may include a plurality of signal leads 420, 422 electrically connected to base contacts 410, 412, for supplying an electrical signal thereto. The present invention is capable of transmitting a broad spectrum of electrical signals, including but not limited to both digital and analog signals representative of data, voice or music. The invention is also capable of transmitting power signals, for example AC or DC electrical power supplied to operate a light, led, luminaire, or any electrical device requiring AC or DC power.

Figure 14:
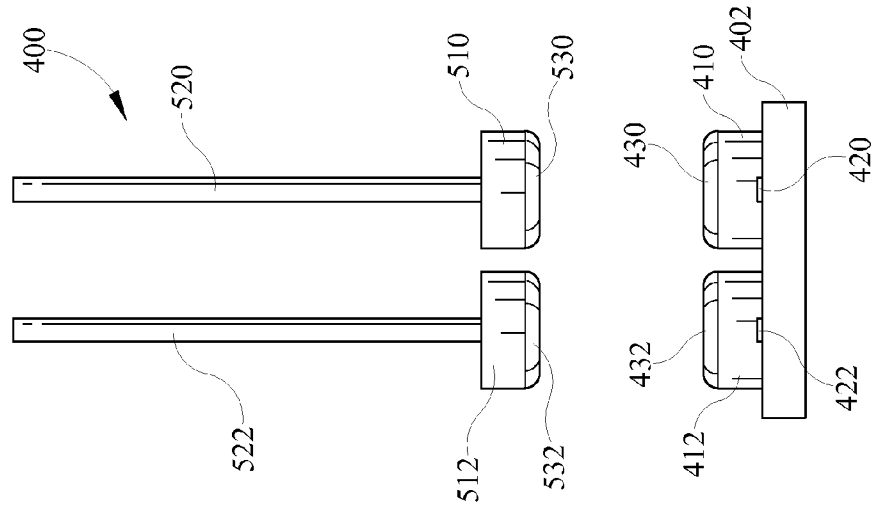
FIG. 14 is a front elevation view of a magnetic electrical contact system in accordance with one embodiment of the invention.
Figure 13:
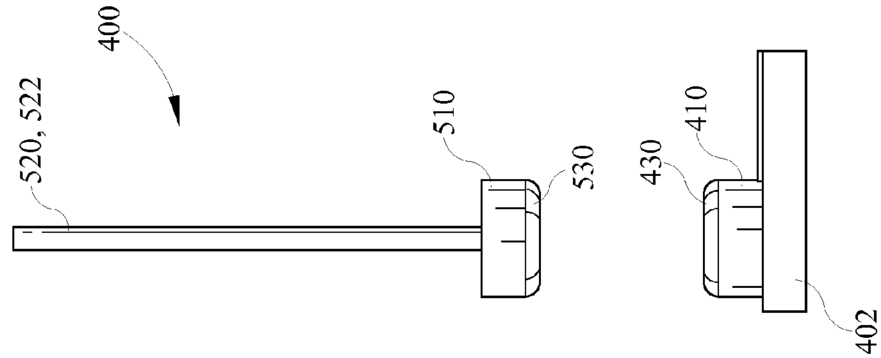
FIG. 13 is a side elevation view of a magnetic electrical contact system in accordance with one embodiment of the invention.

Each contact 410, 412 includes a pair of magnetic elements 430, 432 secured to a portion thereof, shown in FIGS. 12-14 as an annular ring around an upper portion of contacts 410, 412. Magnetic elements 430, 432 are not limited in shape that of an annular ring, but may be formed in a wide variety of shapes and sizes depending upon the requirements of a specific contact system 400 application. Magnetic elements 430, 432 have opposite polarities in one embodiment of the invention, thereby providing a system 400 that prohibits improper connection of an electrical signal as discussed further herein below. Additionally, in one embodiment of the invention magnetic elements 430, 432 are comprised of a non-conductive magnetic material, for example ceramic permanent magnets, to inhibit the transmission and concomitant loss of signal energy through magnetic elements 430, 432.

Contact system 400 further comprises a pair of spaced mating contacts 510, 512 each having a signal lead 520, 522 extending there from that is in electrical contact with mating contacts 510, 512. Furthermore, mating contacts 510, 512 have mating surfaces that are shaped to abut and make solid electrical contact with contacts 410 and 412 to complete an electrical circuit. Mating contacts 510 and 512 each include a magnetic element 530, 532 secured to a portion thereof, again shown in FIGS. 12-14 as annular rings around a lower portion of contacts 510, 512.

Magnetic elements 530, 532 are not limited in shape to an annular configuration, but instead may be formed or shaped in a plurality of shapes and sizes depending upon the requirements of a specific contact system 500 application. Magnetic elements 530, 532 also have opposite polarities in one embodiment of the invention, thereby providing a system 400 that prohibits improper connection of an electrical signal as discussed further herein below. Furthermore, the magnetic polarity of elements 530, 532 is opposite of the polarity of corresponding elements 430, 432 such that contacts 410 and 510 have opposite polarities and contacts 420 and 520 have opposite polarities. This feature of the invention provides a system 400 that prohibits crossing signal leads 420 and 520 since magnetic elements 430 and 530 magnetically attract each other (as do elements 432 and 532) while elements 430 and 532 will repulse each other (as will elements 432 and 530), thereby prohibiting improper signal connections. As before, in one embodiment of the invention magnetic elements 530, 532 are comprised of a non-conductive magnetic material, for example ceramic permanent magnets, to inhibit the transmission and concomitant loss of signal energy through magnetic elements 530, 532.

Figure 15:
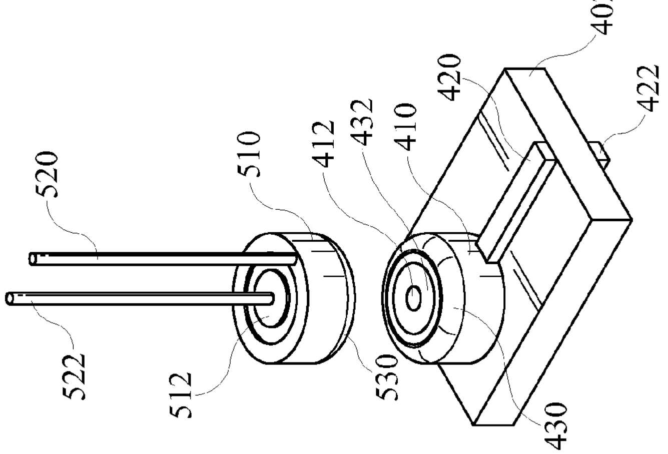
FIG. 15 is a perspective view of a magnetic electrical contact system in accordance with one embodiment of the invention.
Figure 16:
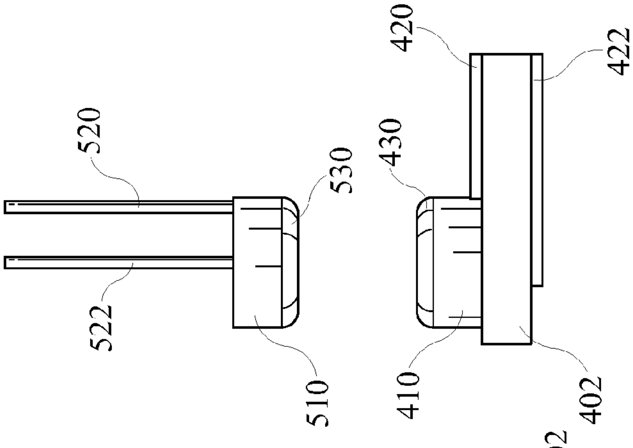
FIG. 16 is a side elevation view of a magnetic electrical contact system in accordance with one embodiment of the invention.
Figure 17:
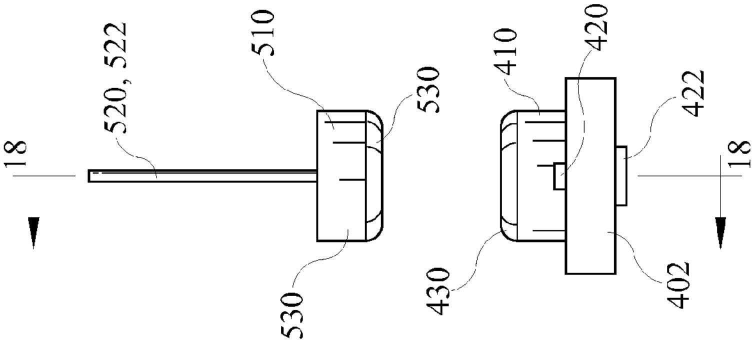
FIG. 17 is a front elevation view of a magnetic electrical contact system in accordance with one embodiment of the invention.
Figure 18:
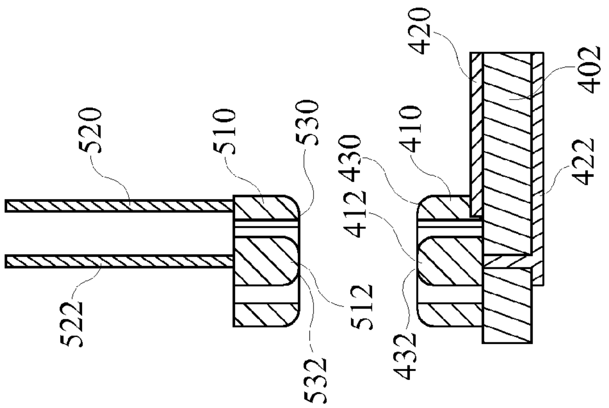
FIG. 18 is a cross-sectional view of a magnetic electrical contact system taken along the line A-A of FIG. 17 in accordance with one embodiment of the present invention.

Referring now to drawing FIGS. 15-18, in a yet further embodiment of the invention a magnetic electrical contact system 400 comprises a concentric pair of base contacts 410, 412, whereby contact 410 is positioned radially outwardly of and electrically insulated from contact 412, as best seen in FIG. 15. In this embodiment of the invention, electrical leads 420, 422 may be disposed on opposed sides of circuit board or substrate 402, such that lead 422 extends upwardly through substrate 402, making electrical contact with central base contact 412, while lead 420 terminates in outer base contact 410. As before, contacts 410 and 412 each include opposite polarity magnetic elements 430, 432 to engage mating contacts as discussed below.

Similarly, this embodiment of the invention provides for a complementary outer mating contact 510 and a central mating contact 512, each terminating in leads 520, 522 as before. Mating contacts 510 and 512 each further comprise opposite polarity electrically conductive magnetic elements 530, 532 for engaging opposite polarity magnetic elements 430, 432 of base contacts 410, 412. As can be seen from the drawing Figs. this embodiment of the invention may provide for a relatively small magnetic electrical contact system 400, since complementary base and mating contacts are concentric with one another. Furthermore, in one embodiment of the invention, more than two contacts may be provided in concentric fashion with insulators there between, thereby providing the ability to connect and transmit signals requiring more than two signal wires.

As can be readily seen from the drawing Figs. and the detailed description herein above, the magnetic electrical contact system of the invention provides a simple and quick system for securing mating signal wires or leads together utilizing magnetic attraction, whereby the strength of magnetic attraction may be customized to provide for ease of separation of mating and base contacts when sufficient force is applied. This feature of the invention is particularly useful for applications such as headphones or ear buds, and further to other commonly used systems such as speakers, power cords and cables, etc.

While the present invention has been shown and described herein in what are considered to be the preferred embodiments thereof, illustrating the results and advantages over the prior art obtained through the present invention, the invention is not limited to those specific embodiments. Thus, the forms of the invention shown and described herein are to be taken as illustrative only and other embodiments may be selected without departing from the scope of the present invention, as set forth in the claims appended hereto.

I claim:

1. A system for completing an electrical circuit comprising:

first and second base contacts electrically isolated from each other, each having a magnetic portion secured thereto, each magnetic portion having an opposite polarity, and each of said base contacts electrically connected to an electrical lead for transmitting an electrical signal through said base contacts; and first and second mating contacts electrically isolated from each other, each having a magnetic portion secured thereto, each magnetic portion having an opposite polarity, and each of said mating contacts electrically connected to an electrical lead for transmitting an electrical signal, whereby said first mating contact is secured to said first base contact by magnetic attraction and whereby said second mating contact is secured to said second base contact by magnetic attraction.

2. A system for completing an electrical circuit as claimed in claim 1 wherein said base contacts are secured to a non-conductive substrate.

3. A system for completing an electrical circuit as claimed in claim 2 wherein said substrate is a circuit board.

4. A system for completing an electrical circuit as claimed in claim 1 wherein said base contacts are disposed in spaced relation from one another.

5. A system for completing an electrical circuit as claimed in claim 1 wherein said base contacts are arranged concentrically and said mating contacts are arranged concentrically.

6. A system for completing an electrical circuit as claimed in claim 1 comprising:

an inner base contact and a concentrically arranged outer base contact electrically insulated from said inner base contact; and an inner mating contact and a concentrically arranged outer mating contact electrically insulated from said inner mating contact whereby said inner base contact makes electrical contact with said inner mating contact and said outer base contact makes electrical contact with said outer mating contact.

7. A system for completing an electrical circuit as claimed in claim 1 comprising:

a plurality of concentrically arranged base contacts electrically insulated from each other; and a plurality of concentric mating contacts electrically insulated from each other.

* * * * *